(12) United States Patent
Tachimori (10) Patent No.: US 8,037,074 B2
(45) Date of Patent: Oct. 11, 2011

(54) CONTENT TYPE REGISTRATION APPARATUS AND CONTENT TYPE REGISTRATION PROGRAM

(75) Inventor: Nobuya Tachimori, Neyagawa (JP)

(73) Assignee: Onkyo Corporation, Neyagawa-shi (JP)

( * ) Notice: Subject to any disclaimer, the term of this patent is extended or adjusted under 35 U.S.C. 154(b) by 526 days.

(21) Appl. No.: 12/099,802

(22) Filed: Apr. 9, 2008

(65) Prior Publication Data

US 2009/0013277 A1   Jan. 8, 2009

(30) Foreign Application Priority Data

Jul. 2, 2007  (JP) .................................. 2007-173762
Feb. 7, 2008  (JP) .................................. 2008-028096

(51) Int. Cl.
G06F 7/00 (2006.01)
G06F 17/30 (2006.01)

(52) U.S. Cl. ...................................................... 707/741
(58) Field of Classification Search ................... 707/741, 707/999.001, 999.002

See application file for complete search history.

(56) References Cited

U.S. PATENT DOCUMENTS

| | | | |
|---|---|---|---|
| 2002/0129167 A1* | 9/2002 | Kanai et al. | 709/247 |
| 2003/0009343 A1* | 1/2003 | Spitzer | 704/277 |
| 2003/0101358 A1* | 5/2003 | Porras et al. | 713/201 |
| 2003/0149742 A1* | 8/2003 | Bollerud | 709/217 |
| 2006/0195509 A1 | 8/2006 | Yoneda | |
| 2006/0248040 A1* | 11/2006 | Tolvanen et al. | 707/1 |

FOREIGN PATENT DOCUMENTS

| | | |
|---|---|---|
| JP | 2004-502239 | 1/2004 |
| JP | 2004-519713 | 7/2004 |
| JP | 2005-502979 | 1/2005 |
| JP | 2005-503639 | 2/2005 |
| JP | 2006-511032 | 3/2006 |
| JP | 2006-221723 | 8/2006 |
| WO | 01/03000 | 1/2001 |
| WO | 02/01373 | 1/2002 |
| WO | 02/067537 | 8/2002 |
| WO | 03/023786 | 3/2003 |
| WO | 03/025933 | 3/2003 |
| WO | 2004/061850 | 7/2004 |

* cited by examiner

*Primary Examiner* — John E Breene
*Assistant Examiner* — Aleksandr Kerzhner
(74) *Attorney, Agent, or Firm* — Renner, Otto, Boisselle & Sklar, LLP

(57) ABSTRACT

A content type registration apparatus and program that obtains from a server a content list which is a list of a plurality of contents, each content having a respective index, and registers the content type for each index corresponding to a respective content in the content list.

8 Claims, 8 Drawing Sheets

```
[playlist]
numberofentries=9
File1=http://scfire-dll01-1.stream.aol.com:80/stream/1071
Title1=(#1 - 131/500) -=[:: HOT 108 JAMZ ::]=- #1 FOR HIP HOP - 128K
HD) * CONNECT FROM OUR WEBSITE www.hot108.com
Length1=-1
File2=http://scfire-dll01-2.stream.aol.com:80/stream/1071
Title2=(#2 - 133/500) -=[:: HOT 108 JAMZ ::]=- #1 FOR HIP HOP - 128K
HD) * CONNECT FROM OUR WEBSITE www.hot108.com
Length2=-1
File3=http://scfire-chi01-1.stream.aol.com:80/stream/1071
Title3=(#3 - 139/500) -=[:: HOT 108 JAMZ ::]=- #1 FOR HIP HOP - 128K
HD) * CONNECT FROM OUR WEBSITE www.hot108.com
Length3=-1
File4=http://scfire-ntc01-1.stream.aol.com:80/stream/1071
Title4=(#4 - 144/500) -=[:: HOT 108 JAMZ ::]=- #1 FOR HIP HOP - 128K
HD) * CONNECT FROM OUR WEBSITE www.hot108.com
Length4=-1
File5=http://scfire-chi01-2.stream.aol.com:80/stream/1071
Title5=(#5 - 145/500) -=[:: HOT 108 JAMZ ::]=- #1 FOR HIP HOP - 128K
HD) * CONNECT FROM OUR WEBSITE www.hot108.com
Length5=-1
File6=http://scfire-nyk01-2.stream.aol.com:80/stream/1071
Title6=(#6 - 154/500) -=[:: HOT 108 JAMZ ::]=- #1 FOR HIP HOP - 128K
HD) * CONNECT FROM OUR WEBSITE www.hot108.com
Length6=-1
```

MIME type list 400

| Index | MIME type |
|---|---|
| 0 | audio/mp3 |
| 1 | audio/mp3 |
| 2 | audio/mp3 |
| 3 | audio/mp3 |
| 5 | text/xml |
| 12 | invalid |
| 13 | audio/aac |
| 16 | image/jpeg |
| .. | .. |

[Fig. 5]

Icon list 500

| MIME type | Icon |
|---|---|
| audio/mp3 | Icon 1 |
| audio/aac | Icon 1 |
| image/jpeg | Icon 2 |
| image/gif | Icon 2 |
| video/mp4 | Icon 3 |
| text/xml | Icon 4 |
| text/pls | Icon 4 |

| Valid |
|---|
| audio/mp3 |
| audio/aac |
| image/jpeg |
| image/gif |
| video/mp4 |
| text/xml |
| text/pls |

CONTENT TYPE REGISTRATION APPARATUS AND CONTENT TYPE REGISTRATION PROGRAM

BACKGROUND OF THE INVENTION

1. Field of the Invention

The present invention relates to a content type registration apparatus that obtains a content type of a content from a server and registers the content type.

2. Description of the Related Art

An internet radio terminal has been available that accesses an internet radio server (hereinafter, referred to as a "server") via the Internet to obtain content data such as a music file or a video file saved on the server, in a streaming format and reproduce the content data. Also, an amplifier apparatus such as an AV amplifier equipped with a function of such an internet radio terminal has been on the market. The AV amplifier has a display unit such as an FL tube and obtains a playlist, which is a list of a plurality of contents, from a server and displays the playlist on the display unit. The AV amplifier displays the title of each content in the playlist and an icon representing a content type (a format such as a music file, a video file, or a link to another playlist). In order to display an icon, the AV amplifier needs to obtain a content type (MIME type) from the server. However, a playlist file such as PLS or M3U that is used by the Internet radio contains a title and a URL representing the location of a content but does not contain a MIME type. Hence, in order to obtain a MIME type, the AV amplifier needs to access a URL of each content in the playlist so that a MIME type is sent from the server; however, requesting for and obtaining MIME types of all contents in the playlist require a tremendous amount of time. As a result, there is a problem that it takes a tremendous amount of time to finish displaying icons representing content types on the display unit of the AV amplifier.

SUMMARY OF THE INVENTION

An object of the present invention is therefore to provide a content type registration apparatus capable of quickly registering MIME types when a playlist does not contain MIME types and the MIME types are obtained from a server separately from the playlist and registered.

According to a preferred embodiment of the present invention, there is provided a content type registration apparatus that obtains from a server a content list which is a list of a plurality of contents and which does not contain content types, and content types of the contents and registers the content type for each index in the content list, the apparatus including: a content type storage unit that registers the content types in association with the indices; a determining unit that determines whether or not a content type of an index adjacent to a registration target index is registered in the content type storage unit; and a registering unit that registers, when the content type of the adjacent index is registered in the content type storage unit, the content type of the adjacent index in the content type storage unit as a content type of the registration target index instead of obtaining the content type of the registration target index from the server, and obtains, when the content type of the adjacent index is not registered in the content type storage unit, a content type of the registration target index from the server and registers the content type in the content type storage unit.

When a content type of an index adjacent to a registration target index is registered in the content type storage unit, instead of obtaining a content type of the registration target index from the server, the content type of the index adjacent to the registration target index is registered in the content type storage unit as the content type of the registration target index. Therefore, comparing with a case where content types of all indices are obtained from the server, the time required to register the content types in the content type storage unit can be reduced. Note that such a process is performed because it is common that contents of the same content type are continued in a content list, and thus, by registering the same content type as that of an adjacent index, roughly correct content types can be quickly registered.

In the preferred embodiment of the present invention, the determining unit may further determine whether or not a content type obtained from the server is valid, when it is determined that the content type obtained from the server is not valid, the registering unit may discard the content type obtained from the server and register, instead of the content type, information indicating invalidity in the content type storage unit, and even when the content type of the adjacent index is registered in the content type storage unit, in a case where the determining unit further determines whether or not the content type of the adjacent index is valid and it is determined that the content type of the adjacent index is not valid, then the registering unit may obtain a content type of the registration target index from the server and register the obtained content type in the content type storage unit without registering the content type of the adjacent index as the content type of the registration target index.

When information indicating invalidity is registered in the content type storage unit as the content type of the adjacent index, in a case where the content type of the adjacent index is registered as the content type of the registration target index, information indicating invalidity is registered as content types of all indices; however, in the present embodiment, in such a case, since a content type of the registration target index is obtained from the server and registered in the content type storage unit, such a problem can be solved. Note that a content type being invalid means that, for example, a device to which the content type registration apparatus of the present invention is applied cannot handle a content of such a content type. For example, when the content type registration apparatus is applied to an Internet radio terminal, a content type being invalid means that the terminal cannot reproduce a content of such a content type. Alternatively, a content type being invalid indicates a case where connection to the server cannot be established.

In the preferred embodiment of the present invention, the content type registration apparatus further comprising a content obtaining unit that requests the server for a content of a selected index and obtains the content of the index and a content type thereof from the server, wherein the determining unit further determines whether or not a content type of the index registered in the content type storage unit is same as the content type obtained by the content obtaining unit, and when the content type of the index registered in the content type storage unit is not the same as the content type obtained by the content obtaining unit, the registering unit re-registers the content type obtained by the content obtaining unit as the content type of the index.

In the preferred embodiment of the present invention, the content type registration apparatus further comprising a content type obtaining unit that selects the registration target index of a content type as which the content type of the adjacent index is registered in the content type storage unit, and obtains a content type of the registration target index from the server, wherein the determining unit further determines whether or not a content type of the index registered in the content type storage unit is same as the content type obtained by the content type obtaining unit, and when the content type of the registration target index registered in the content type storage unit is not the same as the content type obtained by the content type obtaining unit, the registering unit re-registers the content type obtained by the content type obtaining unit as the content type of the registration target index.

In the preferred embodiment of the present invention, the content type registration apparatus further comprising a display unit that displays a content list including the content types, wherein when a content type displayed on the display unit is re-registered by the registering unit, the content type displayed on the display unit is changed to a re-registered content type.

In the preferred embodiment of the present invention, the index adjacent to the registration target index is an index immediately before the registration target index.

In the preferred embodiment of the present invention, the index adjacent to the registration target index is an index immediately after the registration target index.

DETAILED DESCRIPTION OF THE PREFERRED EMBODIMENTS

Figure 1:
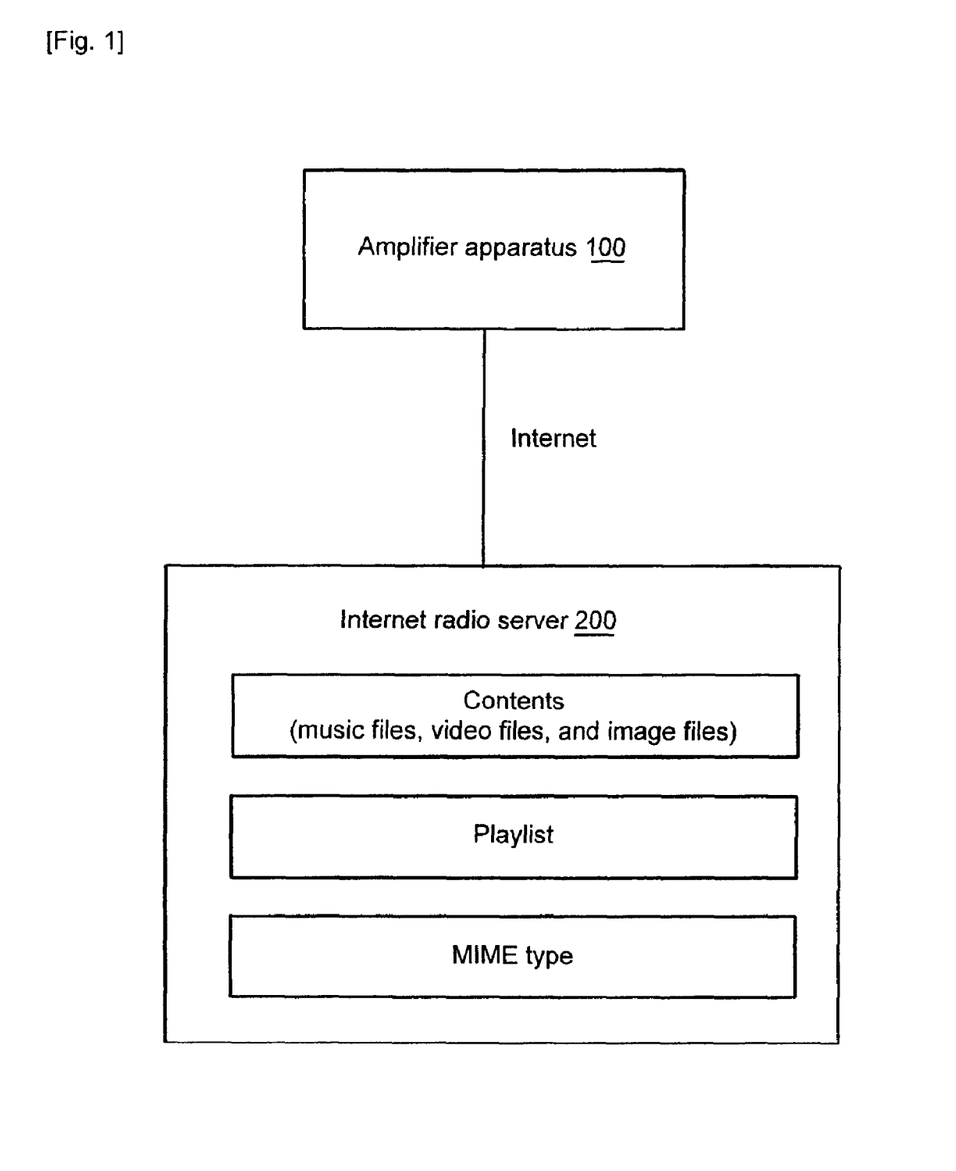
FIG. 1 is a block diagram showing a connection configuration between an amplifier apparatus 100 and a server 200.

Although embodiments of the present invention will be described in detail below with reference to the drawings, the present invention is not limited thereto. FIG. 1 is a block diagram showing a connection configuration between an amplifier apparatus 100 to which a content type registration apparatus according to an embodiment of the present invention is applied and an Internet radio server (hereinafter, simply referred to as the "server") 200.

The server 200 stores a plurality of contents called Internet radios. The contents include music (audio) data, video data, image data, etc., but representatively include music data. Each content is provided with a URL (uniform resource locator) representing a location on the Internet, so that the amplifier apparatus 100 can access the URL to obtain the content.

Figure 2:
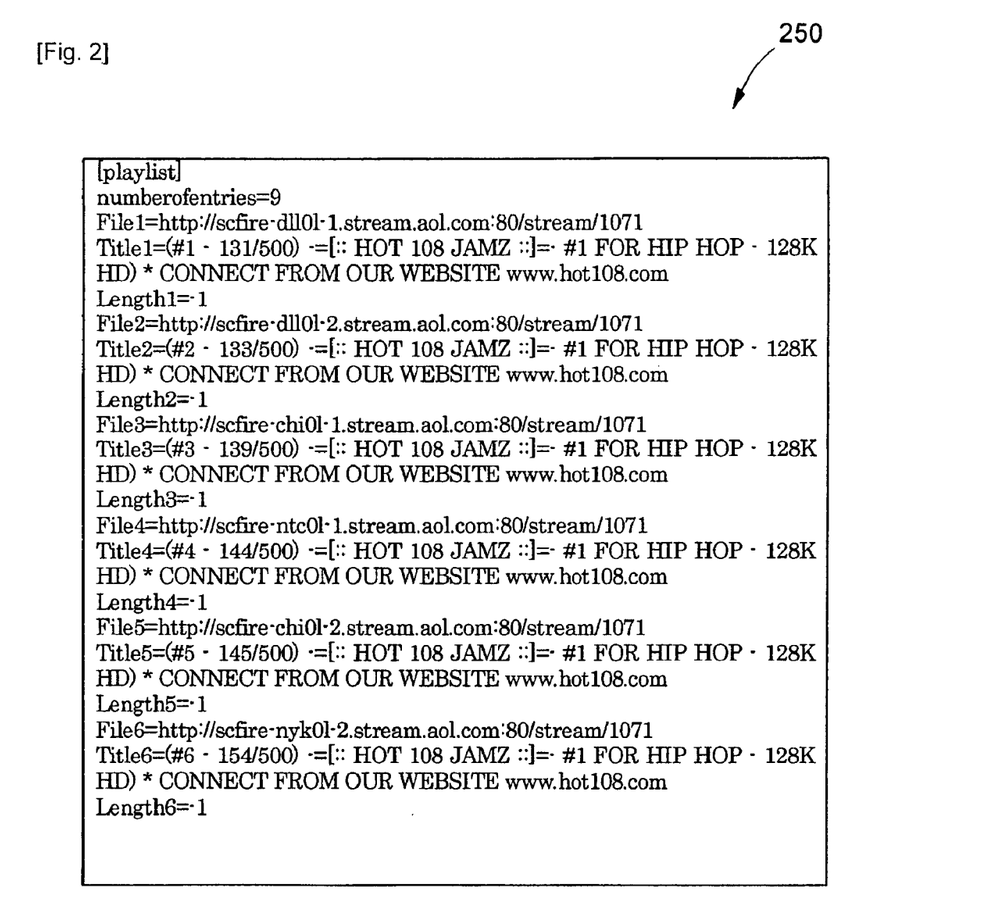
FIG. 2 is a diagram showing a playlist.

The server 200 also stores a playlist (content list) which is a list of content information on a plurality of contents selected from all contents stored therein. The content information includes meta data such as titles, artist names, album names, and genre names, content lengths, released years, etc. In the present embodiment, the content information includes titles. FIG. 2 is a diagram showing an example of the playlist 250. In the playlist 250 in FIG. 2, six contents are listed and a URL and a title are described for each content. The portion described as "File1=http:// . . . " represents a URL and the portion described as "Title=. . . " represents a title. The playlist 250 does not contain MIME types which represent content types.

Also, on the server 200 are saved MIME types of the respective contents stored thereon. The MIME types will be described in detail later.

In response to a request from the amplifier apparatus 100, the server 200 sends contents, a playlist, and MIME types back to the amplifier apparatus 100.

The amplifier apparatus 100 has a function as an Internet radio terminal and thus obtains a content in a stream format from the server 200 via the Internet and reproduces the obtained content. Also, the amplifier apparatus 100 obtains a playlist from the server 200. The amplifier apparatus 100 accesses URLs described in the playlist to obtain MIME types and register the MIME types for each content. Then, when displaying the playlist, icons corresponding to the MIME types registered for the respective contents are also displayed.

In the present embodiment, in order to quickly register MIME types, when a MIME type of an index adjacent to a registration target index in a playlist is already registered, without obtaining a MIME type of the registration target index from the server 200, the same MIME type as that of the adjacent index is registered. Such a process is performed because it is common that contents of the same MIME type are continued in an Internet radio playlist, and thus, by registering the same MIME type as that of an adjacent index, roughly correct MIME types can be quickly registered. The adjacent index indicates an index immediately before or after a target index; in the present embodiment, the adjacent index indicates an index immediately before a target index. A detailed description will be made below.

Figure 3:
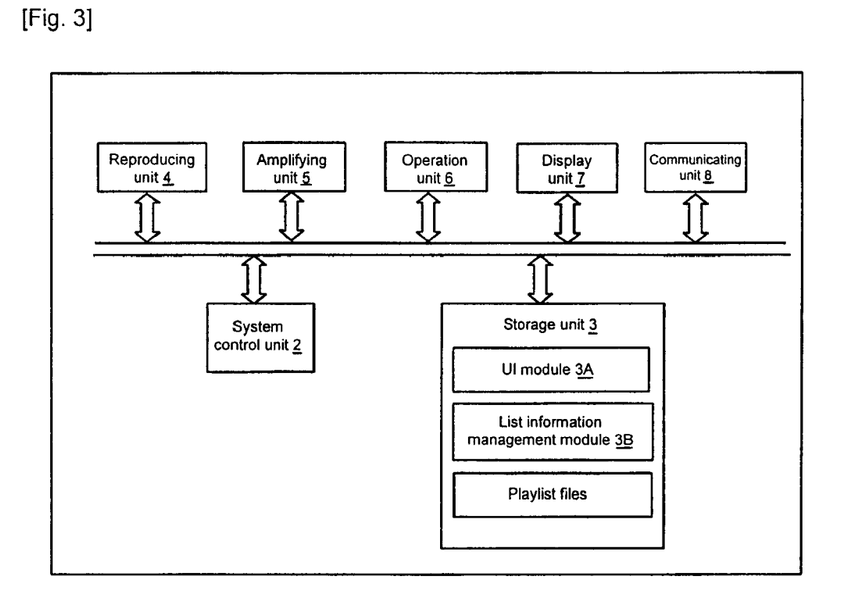
FIG. 3 is a block diagram showing the configuration of the amplifier apparatus 100.

FIG. 3 is a block diagram showing the configuration of the amplifier apparatus 100. The amplifier apparatus 100 roughly includes a system control unit 2, a storage unit (including a ROM, a RAM, a flash memory, etc. (i.e., a non-transitory computer readable medium)) 3, a reproducing unit 4, an amplifying unit 5, an operation unit 6, a display unit 7, and a communicating unit 8. Note that a general configuration of an amplifier apparatus, such as an audio input terminal and a power circuit, is not described herein.

Figure 6:
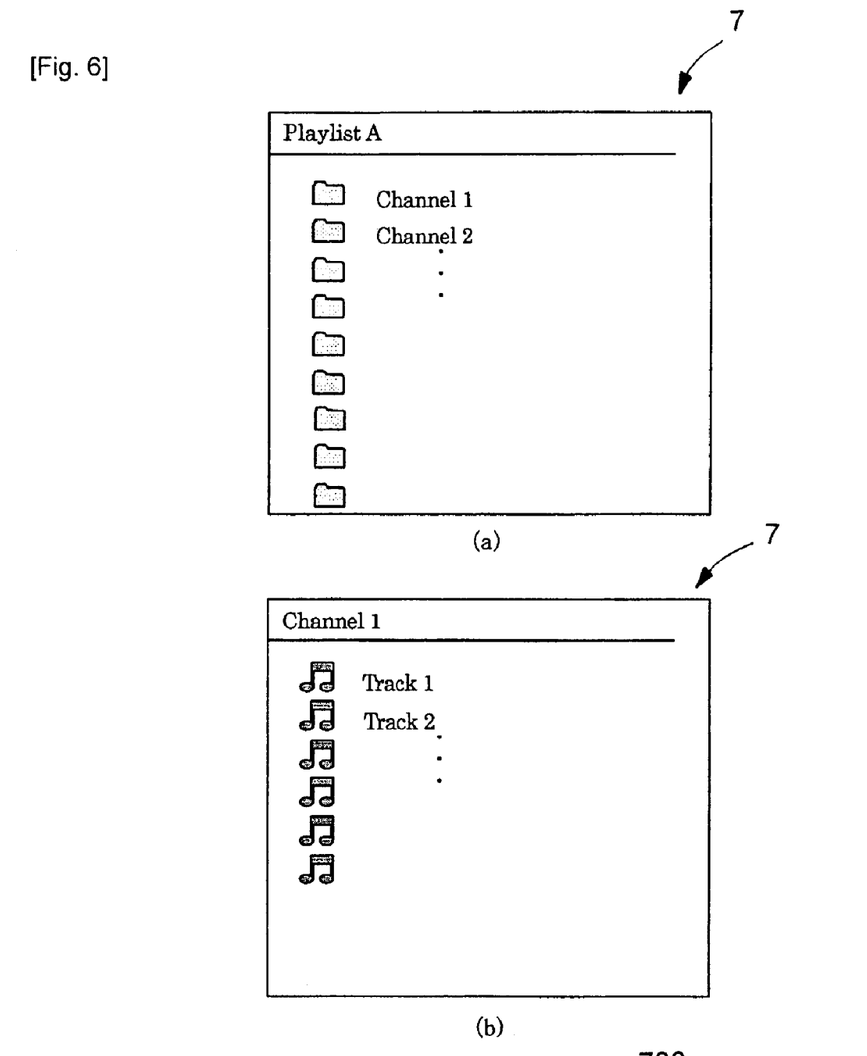
FIG. 6 is a diagram showing playlist display screens.

The UI module 3A is a program for displaying various user interfaces on the display unit 7. For example, the UI module 3A displays content information (titles in the present embodiment) on contents contained in a playlist obtained from the server 200, together with icons corresponding to MIME types obtained from the server 200 (see FIG. 6).

The list information management module 3B is a program for obtaining a playlist and MIME types from the server 200 and registering the MIME types for each content. When the list information management module 3B receives from the UI module 3A a request for a MIME type with an index being specified, the list information management module 3B determines whether or not a MIME type of an index immediately before the specified index is already registered. If the MIME type of the index immediately before the specified index is already registered, then that MIME type is registered as a MIME type of the specified index. If the MIME type of the index immediately before the specified index is not registered, then a MIME type is obtained from the server 200 and the obtained MIME type is registered.

In the storage unit 3 are saved playlist files shown in FIG. 2 which are obtained from the server 200 by the list information management module 3B.

Figure 4:
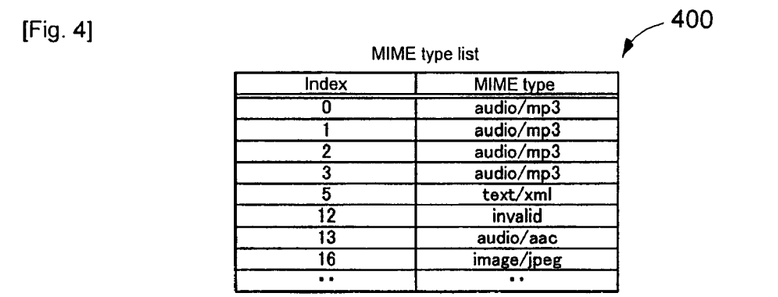
FIG. 4 is a diagram showing a MIME type list.

The storage unit 3 stores a MIME type list 400 (content type registering unit) shown in FIG. 4. In the MIME type list 400, first, nothing is registered and in response to a request from the UI module 3A, the list information management module 3B registers a MIME type for each index. The MIME type list 400 contains MIME types of contents in association with indices of a playlist stored in the storage unit 3. The indices are characters or symbols that are used as clues to find target information. In the present embodiment, the indices are serial numbers (integers starting from 0) of the contents contained in the playlist. In the present embodiment, the indices are provided by the UI module 3A and the list information management module 3B but may be provided in advance by the server 200. The MIME type is information indicating a type (format) of content data used in the Web and is a character string in the format "type name/subtype name". For example, "audio/mp3" represents an MP3-format music file and "image/jpeg" represents a JPEG-format image file. The playlist may contain link information to another playlist (i.e., a higher level folder in a hierarchical structure playlist) instead of contents themselves. Such link information is also provided with a MIME type and the MIME type is represented by "text/xml", "text/pls", or the like. For a MIME type representing a format that is not handled (i.e., that cannot be reproduced) by the amplifier apparatus 100, "invalid" representing invalidity is registered. Though not restricted in particular, the registered contents of the MIME type list 400 are cleared when the playlist is discarded from the storage unit 3.

Figure 5:
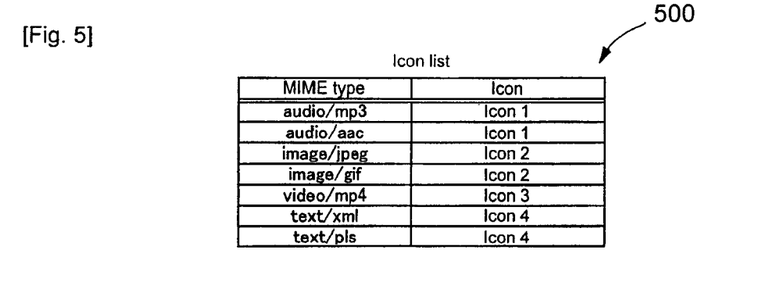
FIG. 5 is a diagram showing an icon list.

The storage unit 3 further stores an icon list 500 shown in FIG. 5. The icon list 500 is a list used to check by the UI module 3A a MIME type obtained from the list information management module 3B against the icon list 500 to identify an icon to be displayed. In the icon list 500, information on icons to be displayed is registered in advance so as to be associated with MIME types. For example, "audio/mp3" is associated with an icon (musical note icon) representing a music file and an icon such as that shown in FIG. 6(b) is displayed. Also, "text/xml" is associated with an icon (folder icon) representing link information and an icon such as that shown in FIG. 6(a) is displayed. Note that image data on icons itself is recorded in advance in the storage unit 3.

Figure 7:
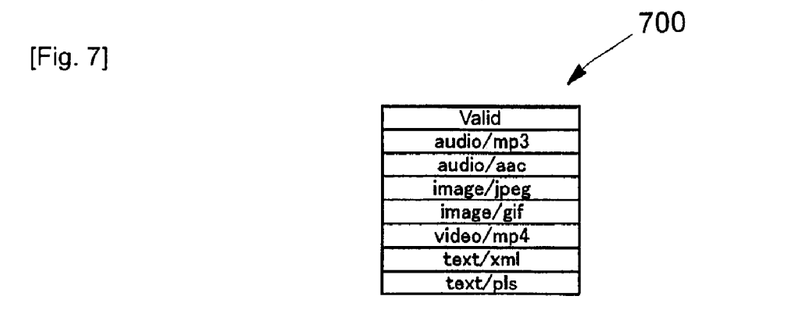
FIG. 7 is a diagram showing a valid type list.

The storage unit 3 further stores a valid type list 700 shown in FIG. 7. The valid type list 700 is used to determine by the list information management module 3B whether the amplifier apparatus 100 handles (valid) a MIME type obtained from the server 200 or not (invalid). In the valid type list 700, valid MIME types are registered in advance. Thus, a MIME type not being registered in the valid type list 700 can be determined to be invalid (alternatively, in the valid type list, invalid MIME types may also be registered together with valid MIME types).

Referring back to FIG. 3, the reproducing unit 4 performs a reproduction process (including a decompression process, a D/A conversion process, etc.) on a music file obtained in a streaming format, for example, from the server 200 by accessing a URL described in the playlist. The amplifying unit 5 amplifies a music signal reproduced by the reproducing unit 4 and supplies the music signal to a speaker (not shown).

The operation unit 6 accepts an instruction from a user and sends the instruction to the system control unit 2. The operation unit 6 includes operation buttons provided on a front panel of the amplifier apparatus 100 and a remote control transmitter/receiver. The display unit 7 displays a playlist, etc., in the manner shown in FIGS. 6(a) and 6(b) and is an FL tube, an LCD (liquid crystal display), etc. The display unit 7 may perform an OSD (on-screen display) on a display apparatus such as a liquid crystal monitor or a television receiver connected to an external source.

The communicating unit 8 establishes connection to the server 200 via the Internet to send and/or receive various commands, contents, playlists, MIME data, etc., to/from the server 200. The communicating unit 8 is a network interface or the like.

Figure 8:
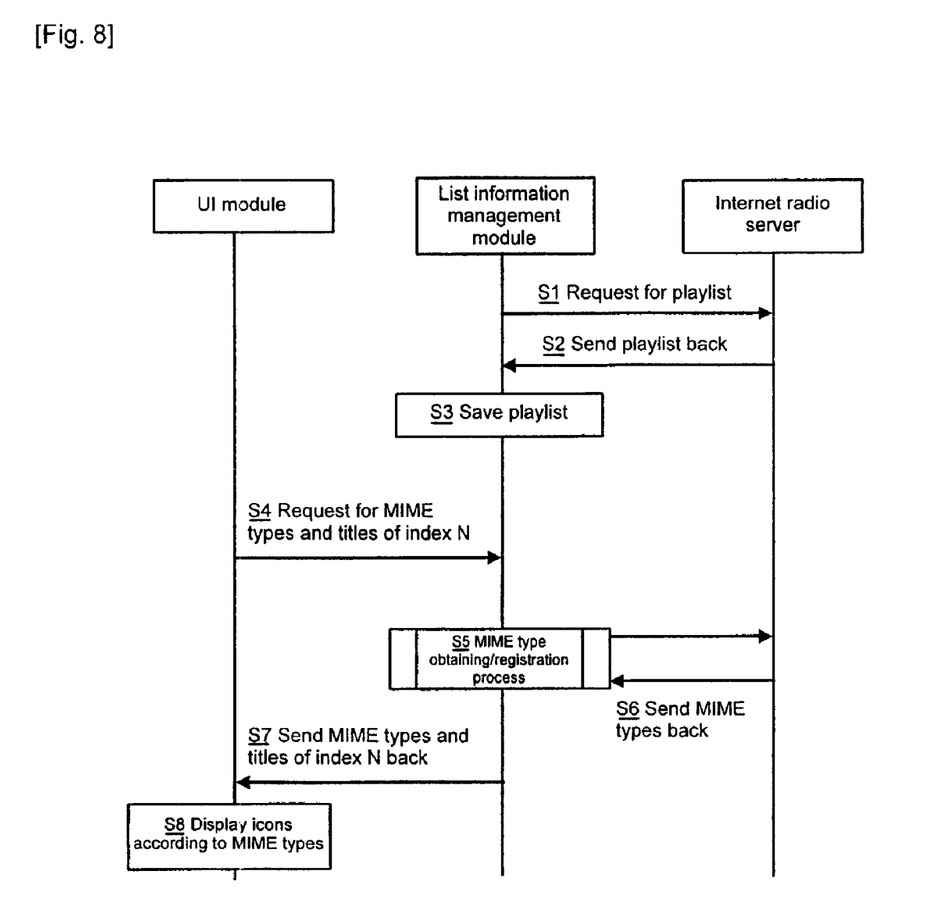
FIG. 8 is a flowchart showing a playlist display process of the amplifier apparatus 100.

The operation of the amplifier apparatus 100 having the above-described configuration will be described. FIG. 8 is a flowchart showing a process in which the amplifier apparatus 100 obtains a playlist from the server 200 and displays the playlist. First, when a URL of the server 200 is inputted to the amplifier apparatus 100 by a user operation, the list information management module 3B accesses the server 200 to request for a playlist (S1). In response to the request, the server 200 sends the playlist back to the list information management module 3B (S2). The list information management module 3B receives and saves the playlist in the storage unit 3 (S3).

Subsequently, when an instruction to display the playlist is inputted by a user operation in order to select a music file to be reproduced, the UI module 3A requests the list information management module 3B to send content information (titles in the present embodiment) on an index N and MIME types (S4). Note that, though not restricted in particular, the index N includes the number of indices equivalent to the number of contents displayable on the display unit 7; for example, when 10 contents can be displayed on the display unit 7, 10 indices such as 0 to 9 are specified for the index N.

Figure 9:
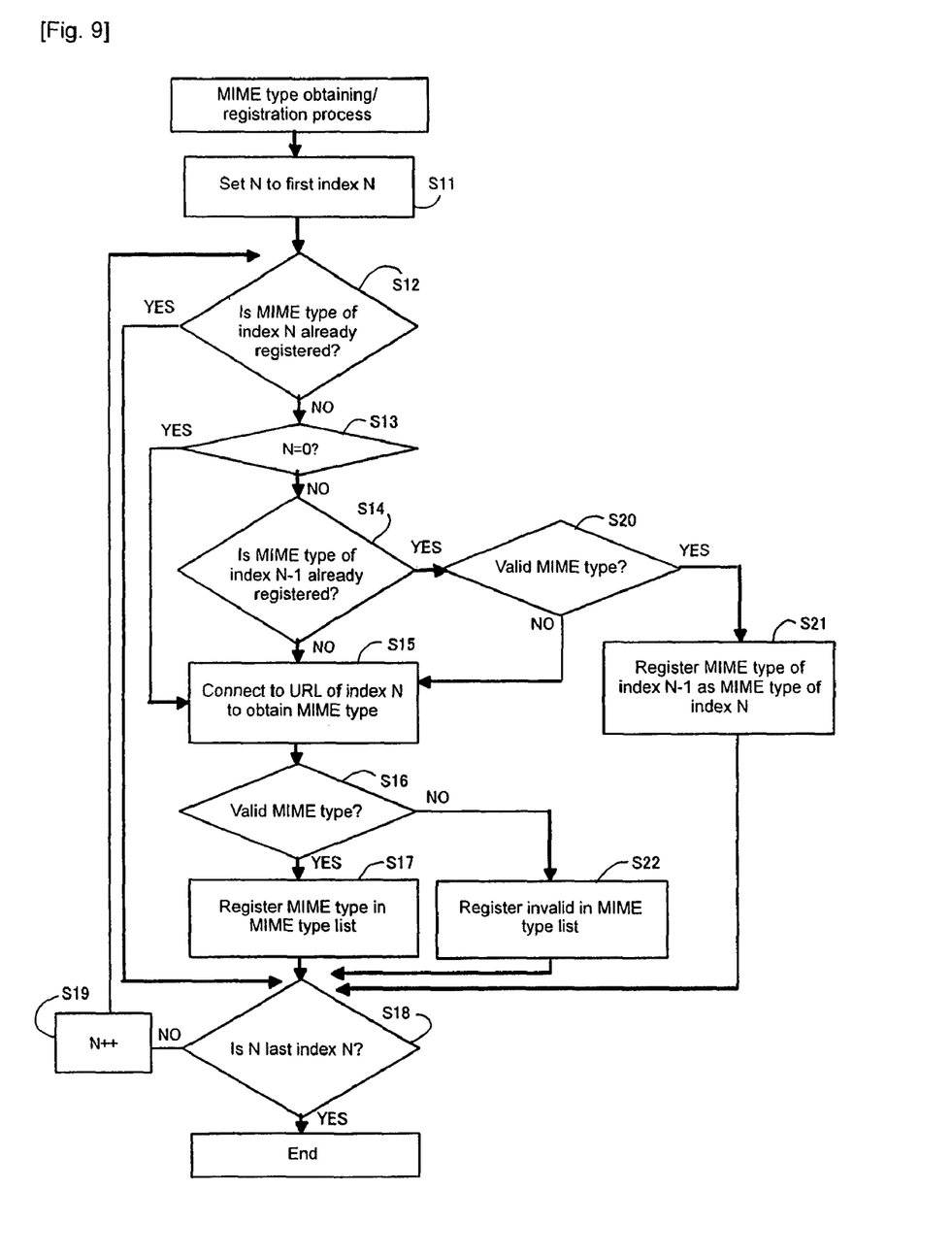
FIG. 9 is a flowchart showing a MIME type obtaining/registration process of a list information management module.

In response to the request from the UI module 3A, the list information management module 3B performs a MIME type obtaining/registration process (S5). The MIME type obtaining/registration process in S5 will be described in detail in FIG. 9. In FIG. 9, the process is repeatedly performed in increasing order (ascending order) of indices requested by the UI module 3A until it is determined in S18 that MIME types of all indices have been registered.

First, the list information management module 3B sets an index N which is a MIME type registration target index, to the first index N among a plurality of indices requested by the UI module 3A (S11). In the present embodiment, N is set to 0. Then, the list information management module 3B determines whether or not a MIME type of the index N is already registered in the MIME type list (S12). If already registered (YES in S12), then the MIME type of the index N does not need to be registered and thus the process proceeds to S18. In S18, it is determined whether or not the index N is the last index (i.e., whether or not MIME types of all requested indices have been registered). If the index N is not the last index (NO in S18), the index N is incremented (S19) and the process returns to S12.

On the other hand, if the MIME type of the index N is not registered in the MIME type list (NO in S12), the list information management module 3B determines whether or not the index N=0 (S13). If the index N=0, then an index immediately before that index does not exist and thus a MIME type of the index immediately before the registration target index cannot be registered as the MIME type of the registration target index. Hence, the process proceeds to S15 where the list information management module 3B refers to the playlist saved in the storage unit 3 and accesses a URL of the index N to request the server 200 for and obtains a MIME type. Note that when the list information management module 3B sends the command "HTTP/HEAD . . . " to the URL of the index N, the server 200 sends a MIME type corresponding to the URL back to the list information management module 3B (S6 in FIG. 8).

After obtaining the MIME type, the list information management module 3B determines whether or not the obtained MIME type is valid (S16). Specifically, it is determined whether or not the obtained MIME type is one registered in the valid type list. If the obtained MIME type is registered in the valid type list (YES in S16), then the list information management module 3B registers the obtained MIME type in the MIME type list in association with the index N (S17). Thereafter, the process proceeds to S18.

On the other hand, if the obtained MIME type is not registered in the valid type list (NO in S16), then the obtained MIME type is discarded and "invalid" representing invalidity is registered in the MIME type list in association with the index N (S22). Thereafter, the process proceeds to S18. Note that a case where a MIME type cannot be obtained from the server 200 due to communication error or incapability of connecting to the server 200 is also determined to be the MIME type being invalid and thus the same process is performed.

On the other hand, if, in S13, N is not 0 (NO in S13), the list information management module 3B determines whether or not a MIME type of an index N−1 (i.e., a MIME type of an index immediately before the index N) is already registered in the MIME type list (S14). If the MIME type of the index N−1 is not registered in the MIME type list (NO in S14), the process proceeds to S15 where similarly the list information management module 3B accesses a URL of the index N to obtain a MIME type from the server 200. Subsequent processes are the same.

If it is determined in S14 that the MIME type of the index N−1 is already registered in the MIME type list (YES in S14), the list information management module 3B determines whether or not the MIME type of the index N−1 is a valid MIME type (S20). Specifically, it is determined whether or not in the MIME type list a MIME type not "invalid" is registered as the MIME type of the index N−1.

If "invalid" is registered as the MIME type of the index N−1 (NO in S20), then the process proceeds to S15 where similarly the list information management module 3B accesses a URL of the index N to obtain a MIME type from the server 200. Subsequent processes are the same. Hence, when the MIME type of the index immediately before the registration target index is invalid, instead of registering "invalid" as the MIME type of the registration target index, the MIME type of the registration target is obtained from the server 200 and thus it is possible to avoid "invalid" from being registered as MIME types of all indices.

On the other hand, if "invalid" is not registered as the MIME type of the index N−1 and a valid MIME type is registered (YES in S20), then instead of requesting for and obtaining a MIME type of the index N from the server 200, the list information management module 3B registers the same MIME type as that of the index N−1 in the MIME type list in association with the index N (S21). Thereafter, the process proceeds to S18.

If it is determined in S18 that MIME types of all indices requested by the UI module 3A have been registered in the MIME type list (YES in S18), then the MIME type obtaining/registration process ends.

As such, when a valid MIME type is registered for an index immediately before a registration target index, by registering the same MIME type as that of the index immediately before the registration target index, a MIME type registration process can be quickly performed. Thus, when MIME types of a plurality of consecutive indices need to be registered, only by obtaining a MIME type of the first index from the server 200 and registering the MIME type, the same MIME type as that of the first index can be registered for the rest of the indices without obtaining their respective MIME types from the server 200; accordingly, the MIME types can be quickly registered. Also, for example, when the MIME type of the first index is invalid and thus "invalid" is registered, without "invalid" being registered for a subsequent index, a MIME type of the subsequent index is obtained from the server 200 and thus it is possible to prevent "invalid" from being registered for MIME types of all indices.

Referring back to FIG. 8, the list information management module 3B sends, for the requested indices, titles described in the playlist and MIME types registered in S5 back to the UI module 3A (S7).

When the UI module 3A receives the titles and the MIME types, the UI module 3A displays, as shown in FIGS. 6(a) and 6(b), for example, the titles and icons corresponding to the MIME types on the display unit 7. Specifically, the UI module 3A refers to the icon list to identify icons corresponding to the MIME types, reads out image data on the icons from the storage unit 3, constructs a screen for a playlist to be displayed, and displays the screen on the display unit 7. Note that when a MIME type is "invalid", an icon (e.g., the icon "x") representing that the amplifier apparatus 100 cannot reproduce a content may be displayed.

As described above, according to the present invention, since MIME types of contents to be displayed on the display unit 7 can be quickly registered, the time required to display a playlist on the display unit 7 can be reduced. For example, when the time required to request for and obtain a MIME type from the server 200 is 3 seconds, obtaining MIME types of all indices (e.g., 10 indices) from the server 200 in a conventional manner requires 10×3=30 seconds; however, in the present embodiment, when a valid MIME type can be obtained for the first index, it takes only 3×1=3 seconds.

Another Embodiment 1

In the present embodiment, in addition to the above-described embodiment (FIG. 9), when the system control unit 2 actually obtains a content of an index N from the server 200 and reproduces the content, a MIME type of the index N can be obtained together with the content; thus, if the MIME type of the index N is wrong, then the MIME type of the index N is corrected, a correct MIME type is registered in the MIME type list, and the MIME type of the index N of a playlist to be displayed on the display unit 7 is changed. By this, first, as described in the above-described embodiment (FIG. 9), MIME types can be quickly displayed and later on, when actually reproducing a content, a correct MIME type can be certainly displayed.

Figure 10:
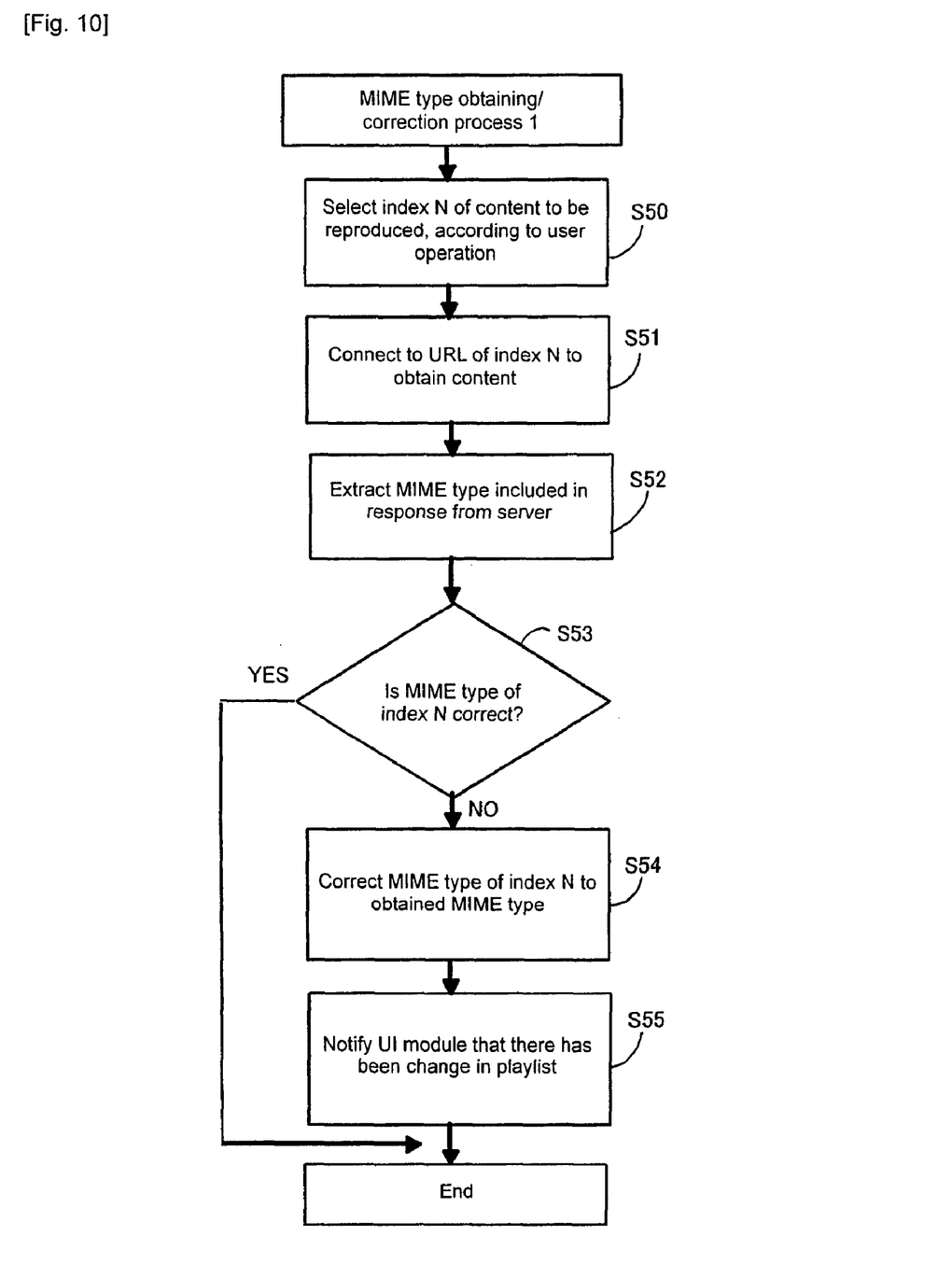
FIG. 10 is a flowchart showing a MIME type obtaining/correction process according to a second embodiment.

More specifically, as shown in FIG. 10, the system control unit 2 selects, according to a user operation, an index N of a content to be reproduced from a playlist (S50). The list information management module 3B sends an HTTP content request command to a URL of the index N, receives from the server 200 a response command including a content of the index N and a MIME type thereof (S51), and extracts the MIME type therefrom (S52). The list information management module 3B determines whether or not the MIME type of the index N registered in the MIME type list is correct, i.e., whether or not the MIME type of the index N registered in the MIME type list is the same as that extracted in S52 (S53). If correct then the process ends, but if not correct (NO in S53) then the list information management module 3B re-registers (corrects) the correct MIME type extracted in S52 for the index N in the MIME type list (S54). Thereafter, the list information management module 3B notifies the UI module 3A that the MIME type of the index N in the playlist has been changed (S55). The UI module 3A requests the list information management module 3B for and obtains the MIME type of the index N and changes a playlist display.

Another Embodiment 2

In the present embodiment, in addition to the above-described embodiment, for example, when the load factor of the system control unit 2 is small, an index N for which a MIME type of an index N−1 immediately before the index N is registered in S21 is selected and a MIME type of the selected index N is actually obtained from the server 200. If the MIME type of the index N that is already registered in the MIME type list is wrong, then the MIME type of the index N is corrected, a correct MIME type is registered in the MIME type list, and the MIME type of the index N of a playlist to be displayed on the display unit 7 is changed. By this, first, as described in the above-described embodiment (FIG. 9), MIME types can be quickly displayed and later on, when the load factor is small, a correct MIME type can be certainly displayed.

Figure 11:
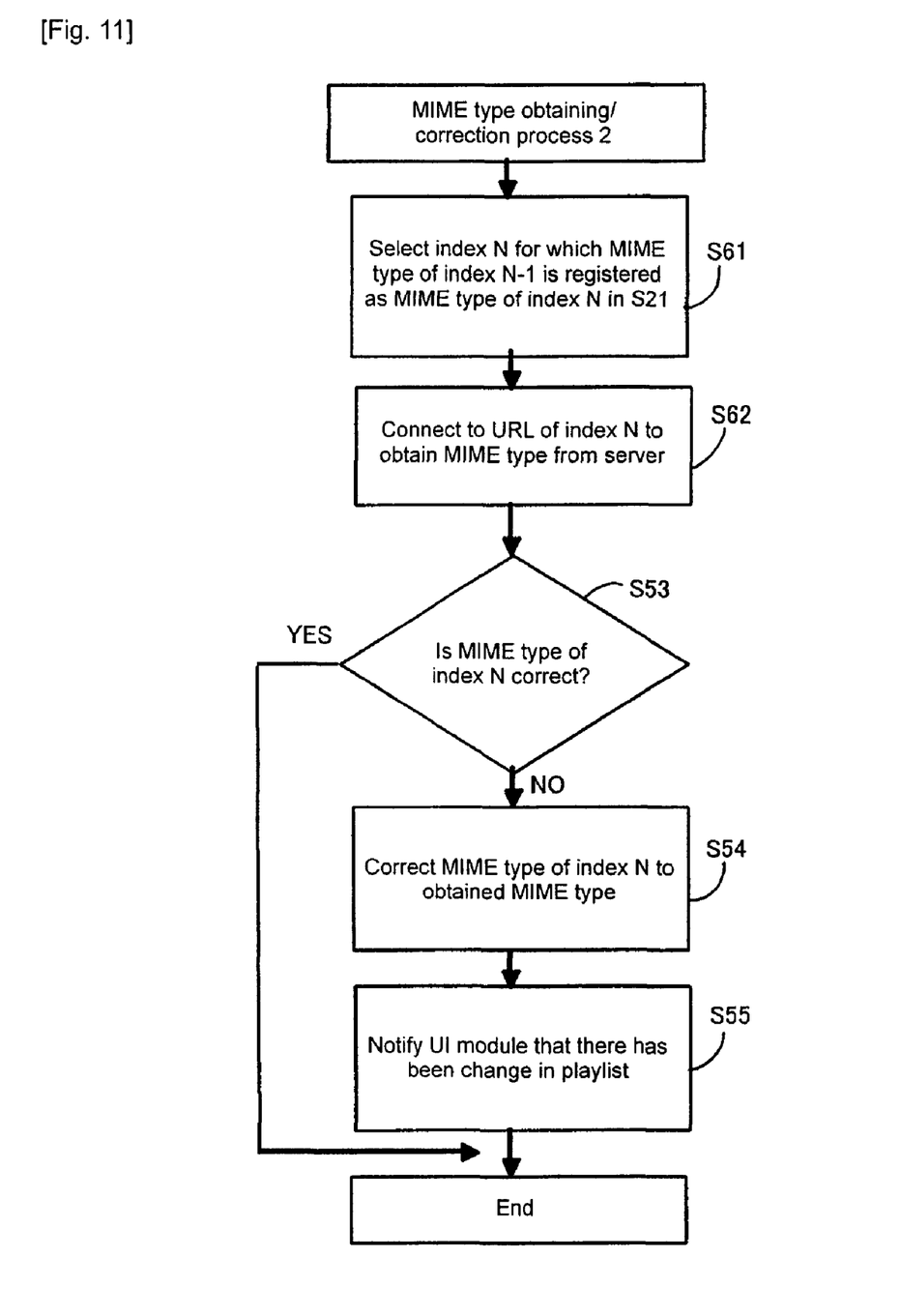
FIG. 11 is a flowchart showing a MIME type obtaining/correction process according to a third embodiment.

More specifically, as shown in FIG. 11, the list information management module 3B selects an index N for which a MIME type of an index N−1 immediately before the index N is registered in S21 (S61). The index N can be managed by setting in S21 a flag in the MIME type list in association with the index N. There is a possibility that a MIME type of the selected index N is wrongly registered. Thus, the list information management module 3B sends an HTTP command to a URL of the index N and obtains a MIME type of the index N from the server 200 (S62). Subsequent processes (S53 to S55) are the same as those in S53 to S55 in FIG. 10 and thus description thereof is not repeated. Note that, in the present embodiment, when one index in a playlist is randomly selected to find that a MIME type thereof is not correct as in the case above, it may be checked whether or not all MIME types are correct.

Although the embodiments of the present invention have been described above, the present invention is not limited thereto. A MIME type send request from the UI module 3A to the list information management module 3B may be performed on an index-by-index basis. The indices are not limited to numbers and may be alphabets. When displaying a playlist in descending order of indices, instead of copying a MIME type of an index immediately before a registration target index, a MIME type of an index immediately after the registration target index may be copied. The present invention may be provided in the form of a computer program for causing the above-described content type registration apparatus to be operated or the form of a storage medium that stores the computer program.

What is claimed is:

1. A content type registration apparatus that obtains from a server a content list which is a list of a plurality of contents, each content having a respective index value within a predefined sequence of index values, and which does not contain content types, and content types of the contents, and registers the content type for each index value corresponding to a respective content in the content list, the apparatus comprising:
a content type storage unit that registers the content types in association with the index values;
a determining unit that determines whether or not a content type of an index value adjacent to a registration target index value within the predefined sequence is registered in the content type storage unit; and
a registering unit that registers, when the content type of the adjacent index value is registered in the content type storage unit, the content type of the adjacent index value in the content type storage unit as a content type of the registration target index value instead of obtaining the content type of the registration target index value from the server, and obtains, when the content type of the adjacent index value is not registered in the content type storage unit, a content type of the registration target index value from the server and registers the obtained content type in the content type storage unit.

2. The content type registration apparatus according to claim 1, further comprising a valid type control unit that controls information that indicates whether or not the content type is valid, wherein
the determining unit further determines whether or not a content type obtained from the server is valid by determining whether or not it is controlled that the content type is valid in the valid type control unit,
when it is determined that the content type obtained from the server is not valid, the registering unit discards the content type obtained from the server and registers, instead of the content type, information indicating invalidity in the content type storage unit, and
the determining unit further determines whether or not information that indicates the content type is not valid is registered to the adjacent index value in the content type storage unit, when information that indicates the content type is not valid is registered, the registering unit obtains a content type of the registration target index value from the server and registers the obtained content type in the content type storage unit without registering the content type of the adjacent index value as the content type of the registration target index value.

3. The content type registration apparatus according to claim 1, further comprising a content obtaining unit that requests the server for a content of a selected index value and obtains the content of the index value and a content type thereof from the server, wherein
the determining unit further determines whether or not a content type of the index value registered in the content type storage unit is same as the content type obtained by the content obtaining unit, and
when the content type of the index value registered in the content type storage unit is not the same as the content type obtained by the content obtaining unit, the registering unit re-registers the content type obtained by the content obtaining unit as the content type of the index value.

4. The content type registration apparatus according to claim 3, further comprising a display unit that displays a content list including the content types, wherein
when a content type displayed on the display unit is re-registered by the registering unit, the content type displayed on the display unit is changed to a re-registered content type.

5. The content type registration apparatus according to claim 1, further comprising a content type obtaining unit that selects the registration target index value of a content type as which the content type of the adjacent index value is registered in the content type storage unit, and obtains a content type of the registration target index value from the server, wherein
the determining unit further determines whether or not a content type of the index value registered in the content type storage unit is same as the content type obtained by the content type obtaining unit, and when the content type of the registration target index value registered in the content type storage unit is not the same as the content type obtained by the content type obtaining unit, the registering unit re-registers the content type obtained by the content type obtaining unit as the content type of the registration target index value.

6. The content type registration apparatus according to claim 4, further comprising a display unit that displays a content list including the content types, wherein
when a content type displayed on the display unit is re-registered by the registering unit, the content type displayed on the display unit is changed to a re-registered content type.

7. The content type registration apparatus according to claim 1, wherein the index value adjacent to the registration target index value is an index value immediately before the registration target index value.

8. A content type registration program stored on a non-transitory computer readable medium causing a computer to perform the steps of:

obtaining a content list which is a list of a plurality of contents and which does not contain content types, each content having a respective index value within a predefined sequence of index values;

determining whether or not a content type of an index value adjacent to a registration target index value within the predefined sequence is registered in a content type storage unit;

when the content type of the adjacent index value is registered in the content type storage unit, registering the content type of the adjacent index value in the content type storage unit as a content type of the registration target index value instead of obtaining the content type of the registration target index value from a server; and when the content type of the adjacent index value is not registered in the content type storage unit, obtaining a content type of the registration target index value from the server and registering the obtained content type in the content type storage unit.

* * * * *